United States Patent
Okada

(10) Patent No.: US 6,563,767 B1
(45) Date of Patent: May 13, 2003

(54) CONNECTING UNIT FOR CONNECTING THE HEAD UNIT TO A HEAD SLIDER IN A HEAD ACTUATOR FOR RECORDING AND/OR REPRODUCING APPARATUS

(75) Inventor: Kanzo Okada, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/461,126

(22) Filed: Dec. 14, 1999

(30) Foreign Application Priority Data

Dec. 15, 1998 (JP) .......................................... 10-356303

(51) Int. Cl.⁷ .............................. G11B 11/00; G11B 7/00
(52) U.S. Cl. ............... 369/13.17; 369/300; 369/112.24; 369/126
(58) Field of Search .......................... 369/13.02, 13.17, 369/13.2, 13.35, 13.4, 283, 286, 126, 112.24, 44.23, 44.24, 300, 112.01, 112.27

(56) References Cited

U.S. PATENT DOCUMENTS 6,243,350 B1 * 6/2001 Knight et al. ............... 369/126
6,449,221 B1 * 9/2002 Knight et al. ............ 369/13.35

* cited by examiner

Primary Examiner—Ali Neyzari
(74) Attorney, Agent, or Firm—Frommer Lawrence & Haug LLP; William S. Frommer; Matthew K. Ryan

(57) ABSTRACT

A recording and/or reproducing head which is small-sized and lightweight and which does not require focussing servo. In order to achieve this result, a head slider is mounted on a supporting spring movable radially of an optical disc. The head slider includes a base having a recording medium facing surface facing the optical disc, a head unit mounted to the head slider so that an optical recording and/or reproducing head will face the optical disc, a connecting unit for connecting the head unit to the air outlet side of the base, and connecting beams including electro-mechanical transducer elements. The electro-mechanical transducer elements of the beams are driven in response to the supplied driving signals to cause fine movement of the recording and/or reproducing head relative to the optical disc along the tracking direction.

23 Claims, 4 Drawing Sheets

CONNECTING UNIT FOR CONNECTING THE HEAD UNIT TO A HEAD SLIDER IN A HEAD ACTUATOR FOR RECORDING AND/OR REPRODUCING APPARATUS

BACKGROUND OF THE INVENTION

This invention relates to a head actuator supporting a magnetic head for recording information on and/or reproducing information from a disc-shaped recording medium and for causing movement of the head in the direction along the radius of the disc-shaped recording medium for positioning the head in a target position. This invention also relates to a recording and/or reproducing apparatus incorporating this head actuator.

In a magnetic disc device or an optical disc device for recording and/or reproducing information signals for a disc-shaped recording medium, attempts are now being made to reduce the size as well as to increase the recording density thereof. For example, a hard disc device may be utilized, in which the track density and the recording density of the recording medium of the disc are raised to increase the recording capacity.

In this hard disc drive of increased recording capacity, the head needs to be precisely positioned on a target track of the disc to which the head is to be accessed.

In general, if a moving object with an inertial moment J is performing a sinusoidal movement with an amplitude A and a frequency f, the amplitude of the angular acceleration $A \cdot \sin(2\pi f t)$, determined from a second order differential of the displacement with respect to time, is equal to $A \cdot (2\pi f)^2$, and the amplitude of the inertial force determined by the product of the angular acceleration and the inertial moment is equal to $J \cdot A \cdot (2\pi f)^2$. Therefore, the driving force T, necessary for causing movement of a moving object with an inertial moment J, is given by T inertial moment (J)

T amplitude (A)

T square of frequency of motion (f).

Thus, if the driving force is constant, the amount of oscillation of the moving object (amplitude) is decreased in inverse proportion to the frequency of motion.

By these mechanical properties, if, in a system in which an object having an inertial moment is kept in motion and its position is controlled, the positioning error is increased roughly in proportion to the square of the frequency, thus deteriorating the control performance.

For enlarging the servo control range of the head positioning system, it is necessary to raise the servo loop gain so that the head/track relative offset will be within the allowable residual servo error value. However, in a single-stage actuator, it has been shown that, for the following reason, the actuator driving power needs to be proportionate to the fourth power of the frequency.

That is, the relationship between the driving force T and the driving current i is given by the equation:

$$Kt \cdot i = T = J \cdot A \cdot (2\pi f)^2 \qquad (1)$$

where Kt is a torque constant.

On the other hand, since the driving power P is proportionate to the square of the driving current i, $$P \; i^2 = ((J/Kt) \cdot A \cdot (2\pi f)^2)^2 \qquad (2)$$

so that it can be rewritten in a proportional form to $$P \; i^2 \; f^4 \qquad (3)$$

That is, the driving power P is proportionate to the fourth power of the frequency of motion.

Therefore, if the rotational speed (rpm) of the disc is doubled, with the head to track misregistration (track misregistration TMR) being fixed, track-related oscillations on the disc are shifted to a doubled value as a whole towards the high side. Thus, the driving power of the actuator is increased by a power of 4 from that for the original disc rotational speed, that is to a 16-fold value.

It is noted that the smaller the actuator size, the smaller the inertial moment J, such that the torque constant to inertial moment ratio Kt/J is increased. Thus, by dividing the actuator into two steps, namely the coarse movement step and the fine movement step, and by reducing the inertial moment to as small a value as is possible for the fine movement driving mechanism, the Kt/J ratio can be correspondingly increased. For example, if the single-stage actuator in current use is used as a coarse movement driving mechanism, and Kt/J of the fine driving movement mechanism is e.g., 36 times that of the coarse movement driving mechanism, the maximum frequency and the driving power that can be controlled are as follows:

That is, as for the controllable band, from equation (1) above, $$(Kt/J) \cdot i = A \cdot (2\pi f)^2.$$

Therefore, if the driving current i and the amplitude A are constant, $f^2 \; Kt/J$, so that $f \sqrt{(Kt/J)}$ and hence the maximum frequency f (fine) that can be controlled by the fine movement driving mechanism is $$f(\text{fine}) = f(\text{coarse}) \cdot \sqrt{36} = f(\text{coarse}) \cdot 6.$$

Therefore, the frequency f (fine) is six times the maximum frequency f (coarse) that can be controlled by the coarse movement driving mechanism.

As for the driving power, since $$P \; ((J/Kt) \cdot A \cdot (2\pi f)^2)^2$$

from equation (2), if the amplitude A and the frequency f are constant, $$P \; (J/Kt)^2.$$

Therefore, the driving power P (fine) required for the fine movement driving mechanism is $$P(\text{fine}) = P(\text{coarse}) \cdot (1/36)^2 = P(\text{coarse}) \cdot (1/1296)$$

or 1/1296 of the driving power P (coarse) required for the rough movement driving mechanism.

Meanwhile, the most difficult problem in improving the track follow mode is that the angular velocity of a rotary actuator in performing track following is extremely small. It has been known that the frictional force generated between the bearing and a ball shaft for an extremely small angular velocity is such that the displacement curve representing the force of rolling friction generally describes a hysteresis loop for an extremely small width of displacement of the order of the rollout angle. The hysteresis is susceptible to irregular changes dependent upon the temperature or humidity, such that, due to non-linearity of the frictional force, prediction of displacement is extremely difficult. This in turn renders positioning control difficult. Thus, in a conventional single-stage actuator, non-linearities produced by the bearing tend to frustrate attempts towards increasing the track density.

In order to cause a magnetic head of a hard disc device to follow a high rotational speed rpm and high track density associated with a conventional voice coil motor (VCM), a double-stage micro-actuator system in a variety of systems may be utilized, such as a system combining a VCM for rough movement and a piezo element for fine movement (PZT), a piggy back system employing a VCM along with rough movement/fine movement, or a system for driving a slider by a piezo element for fine movement (PZT) or an electrostatic actuator.

The micro-actuator for double stage servo is roughly classified into a type mounted on the base of a suspension for driving the head in its entirety, a type for driving a slider and a type for driving a head element.

In the two-stage servo micro-actuator, used for positioning the head to high accuracy, the following problem is met in connection with these respective types.

That is, in the type mounted on the base of the suspension for driving the entire head, it is difficult to enhance the servo bandwidth due to the mass and vibration characteristics of the suspension.

In the slider driving type, the servo range, limited by the acceleration (driving force), is narrower than that in the head element due to the mass weight of the slider.

In the head element driving type, the production process is complex and varied because of integration of the actuator formation and the head element manufacturing steps.

Therefore, insofar as the structure is concerned, the driven movable part of the actuator smaller in size and weight than the slider and can be actuated by a smaller force. In addition, the manufacturing process of the slider driving type micro-actuator is not as complex as the head element driving type and is suited to a batch process.

On the other hand, in an optical disc device, a double-stage actuator for tracking has been used. It is noted that the optical pickup is appreciably larger in size than the magnetic pickup. Since the optical pickup is not of the floating type, as in the magnetic head, the focusing thereof can be controlled electromagnetically. Usually, the optical disc device includes a single sole optical pickup. For achieving an optical pickup which is composed of plural heads and plural discs, an optical pickup as small in size and weight as a magnetic head is required.

OBJECTS AND SUMMARY OF THE INVENTION

It is therefore an object of the present invention to provide a head actuator of the slider driving type wherein the driven moving part is smaller in size and weight than the slider and can be moved with a smaller force.

It is also an object of the present invention to provide a head actuator of the slider driving type which can be manufactured by a process less complex than in the head element driving type and can be more suited to a batch process.

It is a further object of the present invention to provide a recording and/or reproducing apparatus employing this head actuator of the slider driving tape.

It is yet another object of the present invention to provide a head actuator for a floating type optical head for recording and/or reproducing which is small in size and weight and which does not require a focussing servo.

It is a still further object of the present invention to provide a recording and/or reproducing apparatus employing this head actuator for a floating type optical head.

In one aspect, the present invention provides a head actuator including a head for recording information on and/or reproducing information from a disc-shaped recording medium. The head is moved in the radial direction of the disc-shaped recording medium for positioning the head at a target position. The head actuator also includes a head slider and a movable member carrying the head slider. The head slider includes a base having a recording medium facing surface facing the disc-shaped recording medium, a head unit arranged so that the head will face the disc-shaped recording medium, a connecting unit for connecting the head unit to an air outlet side of the base, and an electro-mechanical transducer element forming at least a portion of the connecting unit. The movable member is movable in a direction along the radius of the disc-shaped recording medium. The electromechanical transducer element is moved in response to supplied driving signals for causing fine movement of the head relative to the disc-shaped recording medium along the tracking direction.

The head actuator according to the present invention includes, as the head, an optical recording and/or reproducing head, a proximate optical recording and/or reproducing head, or a magnetic recording and/or reproducing head.

The head actuator according to the present invention may include a mirror in the head unit for guiding a laser light to the recording and/or reproducing head or to the proximate optical recording and/or reproducing head.

The head actuator according to the present invention may further include an optical recording and/or reproducing head and a magnetic recording and/or reproducing head combined on a single head.

The base of the head actuator according to the present invention may be formed of, for example, Si, SiC or $Al_2O_3$—TiC.

The head unit of the head actuator according to the present invention may be formed of, for example, a transparent material having the refractive index of not less than 1.

The head unit of the head actuator according to the present invention may be formed of, for example, Si, SiC or $Al_2O_3$—TiC.

The head unit of the head actuator according to the present invention may be formed of, for example, a transparent material having the refractive index of not less than 1.

Also, the base and the head unit of the head actuator according to the present invention are formed with air lubricating surfaces.

In addition, in the head actuator according to the present invention, the electromechanical transducer element is, for example, a piezo element, which receives driving signals for causing stroke movement of the head relative to the disc-shaped recording medium along the tracking direction.

In another aspect, the present invention provides a recording and/or reproducing apparatus for causing movement of a head in a direction along the radius of the disc-shaped recording medium for recording information thereon and/or reproducing information therefrom, wherein the apparatus includes a head actuator and control means. The head actuator includes a head slider, which has a base which includes a recording medium facing surface facing the disc-shaped recording medium, a head unit arranged so that the head will face the disc-shaped recording medium, a connecting unit for connecting the head unit to an air outlet side of the base, and an electro-mechanical transducer element forming at least a portion of the connecting unit. This electro-mechanical transducer element is adapted for causing fine movement of the head along the tracking direction relative to the disc-shaped recording medium. The head actuator also has a movable member carrying the head slider. The control means generates driving signals supplied to the electro-mechanical transducer element provided in the head slider. The movable member is movable in a direction along the radius of the disc-shaped recording medium. The control means supplies the driving signals to the electro-mechanical transducer element to cause fine movement of the head relative to the disc-shaped recording medium for positioning at a target position.

In the recording and/or reproducing apparatus according to the present invention, the electro-mechanical transducer element is, for example, a piezo element. The control means supplies the driving signals to the piezo element to cause stroke movement of the head relative to the disc-shaped recording medium along the tracking direction.

In the recording and/or reproducing apparatus according to the present invention, an optical recording and/or reproducing head and a magnetic recording and/or reproducing head, combined as a single unit, can be provided as the head. A magnetic disc and an optical disc are selectively used to record and/or reproduce the information.

Specifically, the head unit, connected via the connecting unit to the base of the slider, can be smaller in size and weight than the slider, and can be moved with a smaller force by the electro-mechanical transducer element forming a portion of the connecting unit.

Thus, according to the present invention, in the slider driving type head actuator, the moving part that needs to be driven is smaller in size and weight than the slider and can be moved with a smaller force. Moreover, the manufacturing process is less complex than the head element driving type. According to the present invention, a head actuator is provided suited to batch processes. In addition, a recording and/or reproducing apparatus incorporating this head actuator of the slider driving type is provided. Moreover, according to the present invention, a head actuator for a floating type recording and/or reproducing head is provided which does not require focussing servo. Moreover, a recording and/or reproducing apparatus employing this head actuator of the floating type is provided.

Various other objects, advantages and features of the present invention will become readily apparent from the ensuing detailed description and the novel features will be particularly pointed out in the appended claims.

BRIEF DESCRIPTION OF THE DRAWINGS

The following detailed description given by way of example, but not intended to limit the invention solely to the specific embodiments described, may best be understood in conjunction with the accompanying drawing in which.

DETAILED DESCRIPTION OF CERTAIN PREFERRED EMBODIMENTS

Figure 1:
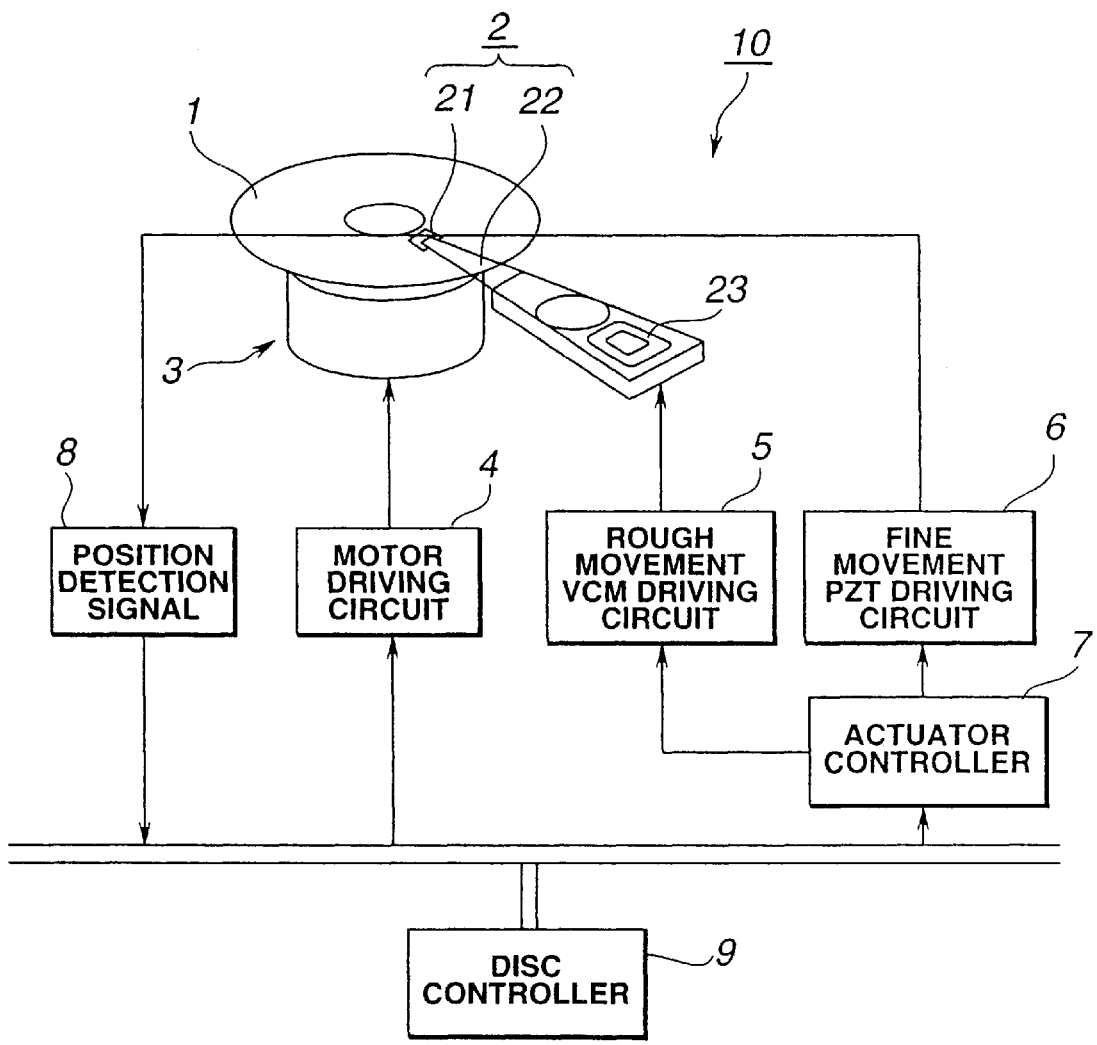
FIG. 1 is a block diagram illustrating a preferred embodiment of an optical disc recording and/or reproducing apparatus in accordance with the teachings of the present invention.

Referring now to the drawings, wherein like reference numerals represent like parts of the several views, preferred embodiments of a head actuator for a recording and/or reproducing apparatus in accordance with the teachings of the present invention are illustrated.

The head actuator of the present invention is incorporated in an optical disc recording and/or reproducing apparatus 10, such as shown for example in FIG. 1.

This head activator 2 of the optical disc recording and/or reproducing apparatus 10 causes movement of a head slider 21 in the radial direction of an optical disc 1 for recording information on and/or reproducing information from the optical disc. The optical disc recording and/or reproducing apparatus 10 also includes a spindle motor 3 with a motor driving circuit 4 and for rotationally driving the optical disc 1, a VCM driving circuit for coarse or rough movement 5 and a PZT driving circuit for fine movement 6 for controlling the movement head actuator 2, an actuator control circuit 7, a position detection circuit 8 and a disc controller 9.

The head actuator 2 includes a supporting spring 22, on the distal end of which is mounted the head slider 21, and a voice coil motor (VCM) 23 for causing movement of the head slider 21 in the radial direction of the optical disc 1. This VCM 23 is driven by the VCM driving circuit for coarse movement 5.

Figure 2:
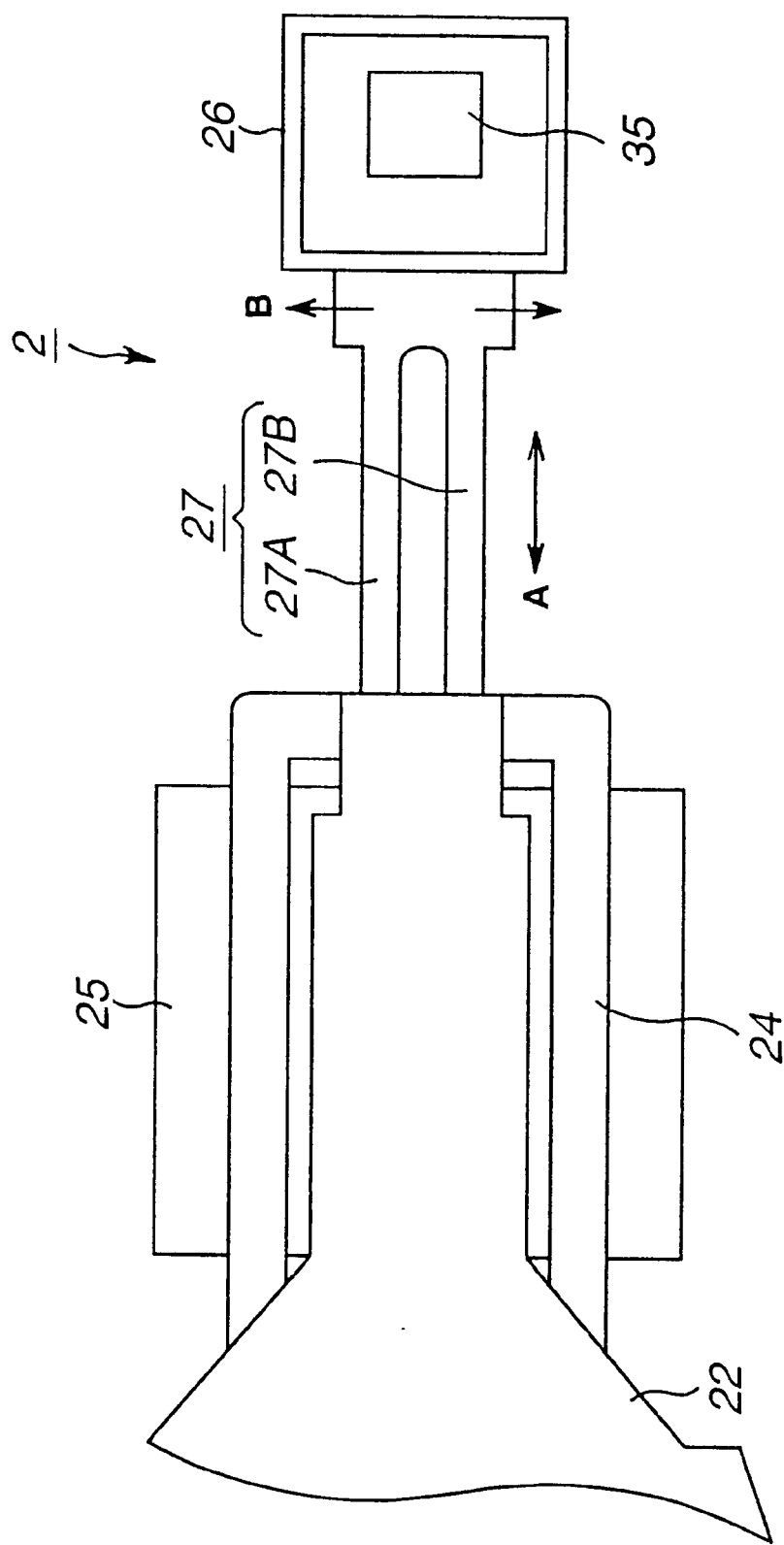
FIG. 2 is an enlarged top plan view illustrating a preferred embodiment for a slider of a head actuator in accordance with the teachings of the present invention for the recording and/or reproducing apparatus of FIG. 1.
Figure 3:
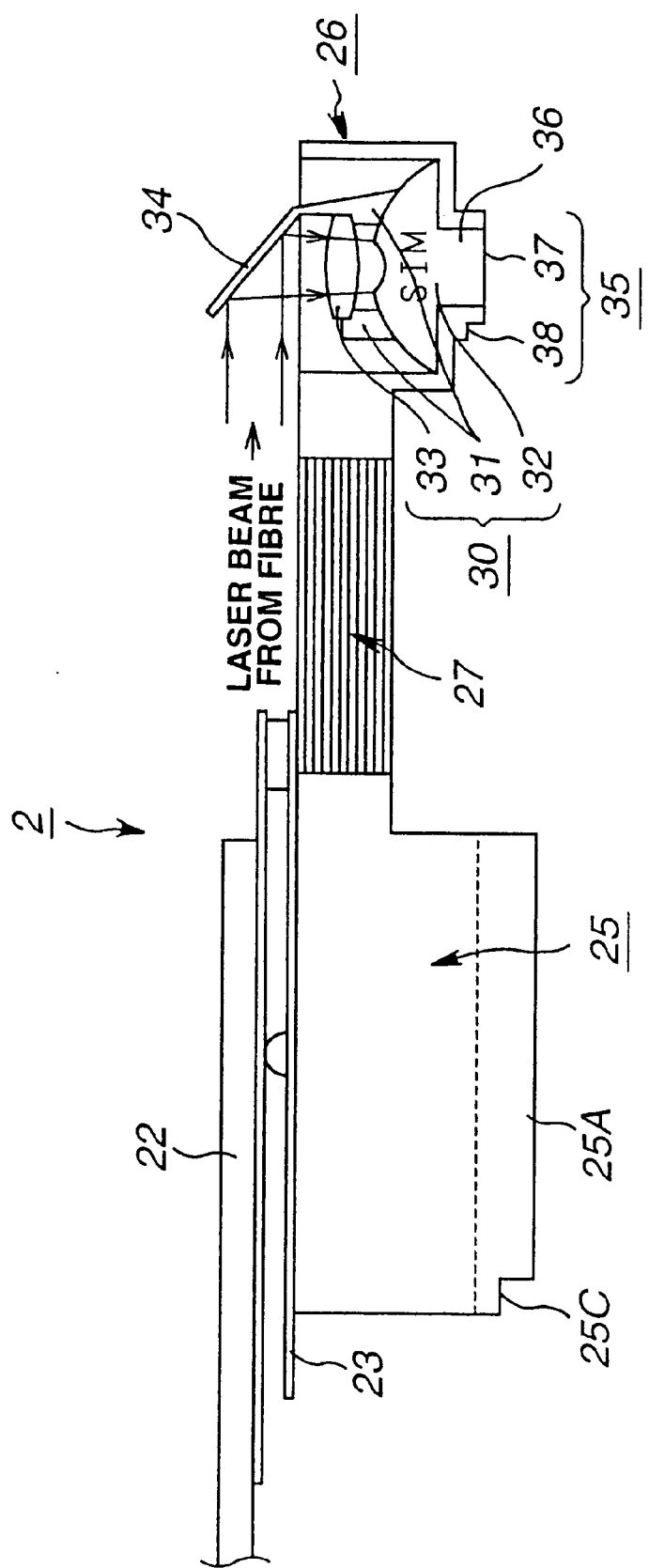
FIG. 3 is an enlarged side view of the slider of FIG. 2.
Figure 4:
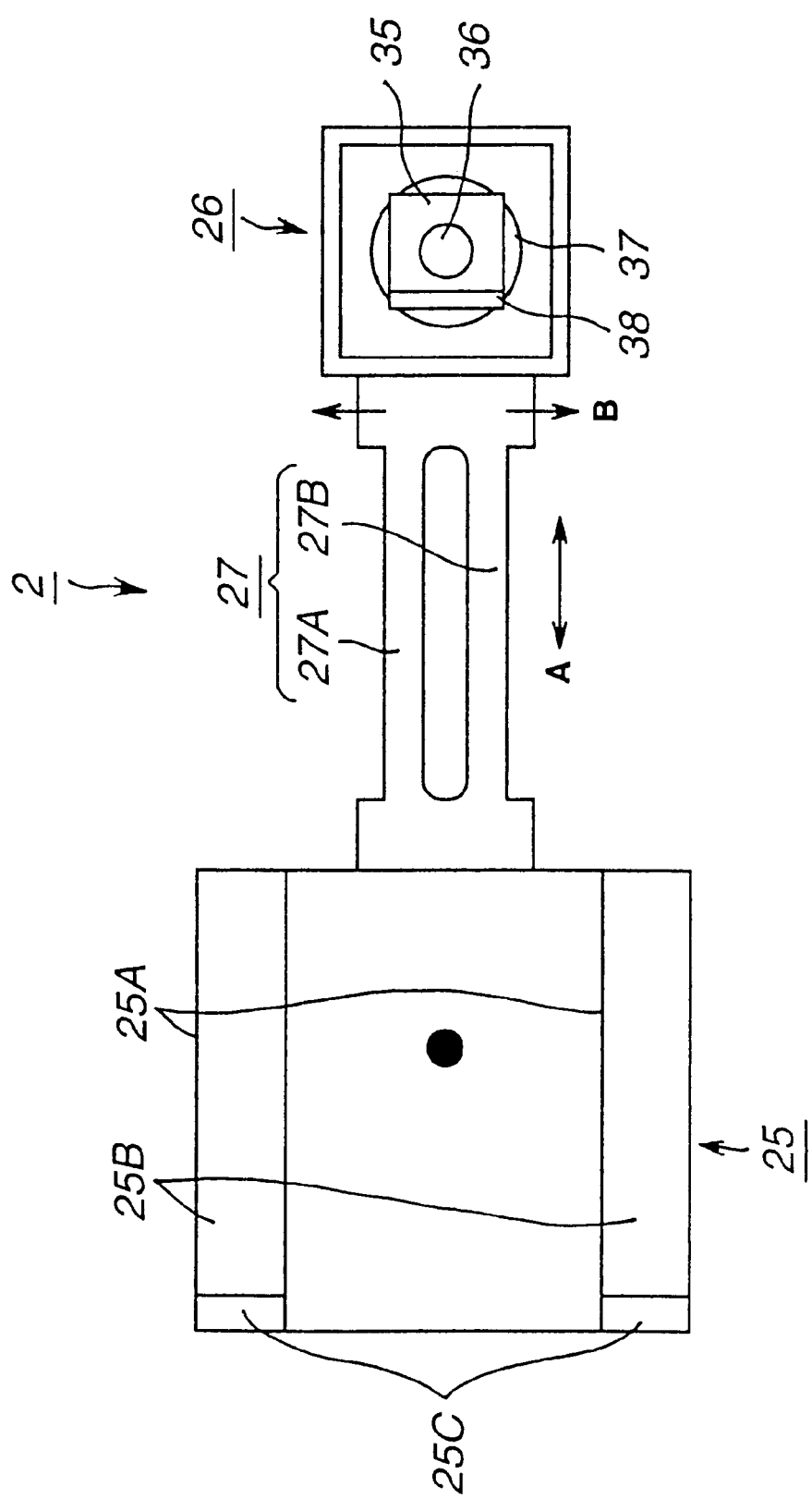
FIG. 4 is an enlarged bottom view of the slider of FIG. 2.

FIGS. 2, 3 and 4 specifically illustrate certain features of a preferred embodiment of head slider 21 of the head actuator of the present invention. As is shown therein, the head slider 21 includes a base 25, supported on the distal end of the supporting spring 22 via a gimbal supporting unit, which is formed of a thin sheet-like supporting piece 24. The head slider 21 further includes a head unit 26, carrying an optical recording and/or reproducing head 30, and a connecting unit 27 interconnecting the base 25 and the head unit 26.

As shown in FIG. 3, two ABS rails 25A are formed on the base 25. An air stream generated on the disc surface by the high-speed rotation of the optical disc 1 flows along these rails 25 between the disc surface and the surface of the base 25 facing the disc to produce floating force. Air lubricating surfaces 25B, processed to e.g., a mirror finish, are formed on the surfaces of the ABS rails 25A facing the optical discs. Also, shoulders 25C are formed on an upstream side end of the above-mentioned ABS rails.

With the base 25, as described above, the air stream, generated upon high-speed rotational driving of the optical disc 1, flows into the space between the disc facing surfaces and the disc surface to flow along the rails 25A to generate a floating force.

The head unit 26 is connected to the air stream outlet side of the base 25 via a connecting unit 27. This head unit 26 is provided with an optical recording and/or reproducing head 30 and a mirror 34 for guiding a laser light to the optical recording and/or reproducing head 30. The optical recording and/or reproducing head 30 is comprised of a collimator 33, carried by a holder 31, and a solid immersion mirror SIM 32 (lens serving for both reflection and refraction). The SIM 32 has a laser light exiting opening 36 embedded in a pad unit 35 facing the disc surface. An air lubricating surface 37, processed to a mirror finish, is formed on the surface of the head unit 26 facing the disc surface, while a shoulder 38 is formed on an upstream side end of the rising air stream.

As best shown in FIGS. 2 and 4, the connecting unit 27 is comprised of two parallel beams 27A, 27B, arranged on a flat plane parallel to the surface of the head unit 26 facing the disc surface, a movable portion connected to the head unit 26 and a stationary portion connected to the base 25.

The two beams 27A, 27B each have one end secured to the base 25 and support the head unit 26 at the other end in a cantilevered fashion. The two beams 27A, 27B include electro-mechanical transducer elements that are extended and contracted in the direction along the longitudinal axis A in response to the driving electrical signals. The two beams 27A, 27B are configured so that, as one of the electromechanical transducer elements is in an extended state, the other electro-mechanical transducer element is in a contracted state. Thus, the two beams 27A, 27B act as a fine movement actuator by being flexed in a direction B crossing the direction of the longitudinal axis direction A in a plane substantially parallel to the facing surfaces thereof facing the optical disc 1 to cause movement of the head unit 26 along the tracking direction with an extremely small stroke (on the order of a micron). The electro-mechanical transducer elements are formed as, for example, piezo elements (PZT) of a multi-layered structure formed of a piezoelectric material. The electro-mechanical transducer elements are fed by a driving circuit for the fine movement PZT with oppositely phased driving signals.

Preferably, the slider is formed of a material taking into account tribological concerns and/or reliability concerns pertaining to the head to disc interface which has a spacing therebetween on the order of a submicron. That is, the base 25 and/or the head unit 26 of the slider 2 may be formed of, for example, Si, SiC or $Al_2O_3$—TiC. Meanwhile, the base 25 and/or the head unit 26 may also be formed of a transparent material having the refractive index of not higher than 1.

In this recording and/or reproducing apparatus 10, the actuator control circuit 7 controls the VCM driving circuit for coarse movement 5 and the PZT driving circuit for fine movement 6, based on the target track information sent from the disc controller and on the position detection signal detected by the position detection circuit, by way of performing tracking servo.

In the recording and/or reproducing apparatus 10 having the head actuator 2 of the present invention, the optical disc 1 is run in rotation at an elevated speed by the spindle motor 3, so that the recording and/or reproducing head 30 provided on the head unit 26 of the slider 2 is floated from the disc surface. Since the amount and the attitude of float of the optical recording and/or reproducing head 30 are determined by the structure of the base 25 of the slider 2 and the air lubricating surface of the head unit 26, the information can be recorded and/or reproduced without the necessity of applying focusing servo.

The head unit 26 connected to the base 25 of the slider 2 via the connecting unit 27 is smaller in size and lighter in weight than the slider, so that, by moving the head unit 26 as a result of the electromechanical transducer elements formed by the two beams 27A, 27B of the connecting unit 27, it becomes possible to increase the bandwidth of the tracking servo.

Since the mirror 34 for guiding the laser light to the optical recording and/or reproducing head 30 is also provided on the holder 31 and is driven simultaneously with the optical recording and/or reproducing head 30, the mirror 34 need not be of the movable type. Thus, there is no necessity of introducing the technique of a complex micro electro-mechanical machining system (MEMS) into the present invention.

Moreover, with the present optical recording and/or reproducing apparatus 10, in which the head unit 26 connected to the base 25 of the slider 2 via the connecting unit 27 and is smaller in size and weight than the slider, it becomes possible to reduce the size of the apparatus. Moreover, plural optical discs and plural optical recording and/or reproducing heads 30 can be assembled into one housing structure.

The head unit 26 of the head actuator 2 may also be provided with a conventional type double lens system or a proximate field optical recording and/or reproducing head, as the optical recording and/or reproducing head.

Further, in place of providing the optical recording and/or reproducing head 30, a magnetic recording and/or reproducing head may be provided on the head unit 26 of the head actuator 2 to constitute a magnetic recording and/or reproducing apparatus.

Also, an optical recording and/or reproducing head and a magnetic recording and/or reproducing head may be provided as a combined unit in the head 26 of the head actuator 2 to enable a magnetic disc and an optical disc to be used selectively to record and/or reproduce the information to constitute a removable type recording and/or reproduction.

Although the invention has been particularly shown and described with reference to certain preferred embodiments, it will be readily appreciated by those of ordinary skill in the art that various changes and modifications may be made therein without departing from the spirit and scope of the invention. It is intended that the appended claims be interpreted as including the foregoing as well as various other such changes and modifications.

What is claimed is:

1. A head actuator carrying a head for recording information on and/or reproducing information form a disc-shaped recording medium, said head being movable in the radial direction of the disc-shaped recording medium for positioning at a target position, said head actuator comprising:

a head slider including a base having a recording medium surface facing said disc-shaped recording medium;

a head unit arranged on said head slider so that said head faces said disc-shaped recording medium;

a connecting unit for connecting said head unit to an air outlet side of said base wherein said connecting unit includes at least two beams which are parallel to the surface of the head unit facing the disc surface;

an electro-mechanical transducer element forming at least a portion of each of said beams of said connecting unit; and a movable member carrying said head slider which is movable in a tracking direction along the radius of said disc-shaped recording medium;

wherein each of said electro-mechanical transducer elements is being moved in response to signals supplied driving signals so that as one of the electromechanical transducer elements of one beam is in an extended state, another electro-mechanical transducer element of another beam is in a contracted state for achieving fine movement of the head relative to the disc-shaped recording medium along the tracking direction.

2. The head actuator according to claim 1 wherein said head is an optical recording and/or reproducing head.

3. The head actuator according to claim 2 wherein said head is a proximate field optical recording and/or reproducing head.

4. The head actuator according to claim 2 wherein said head is provided with a mirror for guiding a laser to said optical recording and/or reproducing head.

5. The head actuator according to claim 3 wherein said head is provided with a mirror for guiding a laser to said proximate field optical recording and/or reproducing head.

6. The head actuator according to claim 1 wherein said head is a magnetic recording and/or reproducing head.

7. The head actuator according to claim 1 wherein said optical recording and/or reproducing head and the magnetic recording and/or reproducing head are combined in a single head.

8. The head actuator according to claim 1 wherein said base is formed of Si.

9. The head actuator according to claim 1 wherein said base is formed of SiC.

10. The head actuator according to claim 1 wherein said base is formed of $Al_2O_3$—TiC.

11. The head actuator according to claim 1 wherein said base is formed of a transparent material with a refractive index of not less than 1.

12. The head actuator according to claim 1 wherein said head unit is formed of Si.

13. The head actuator according to claim 1 wherein said head unit is formed of SiC.

14. The head actuator according to claim 1 wherein said head unit is formed of $Al_2O_3$—TiC.

15. The head actuator according to claim 1 wherein said head unit is formed of a transparent material with a refractive index of not less than 1.

16. The head actuator according to claim 1 wherein said base and the head unit are formed with air lubricating surfaces.

17. The head actuator according to claim 1 wherein said electro-mechanical transducer element is a piezo element fed with driving signals for causing stroke movement of said head with respect to the disc-shaped recording medium along the tracking direction.

18. A recording and/or reproducing apparatus for causing movement of a head in a direction along the radius of the disc-shaped recording medium for recording and/or reproducing information, comprising:
a head actuator having:
a head slider including a base having a recording medium surface facing said disc-shaped recording medium;
a head unit arranged on said head slider so that said head faces said disc-shaped recording medium;
a connecting unit for connecting said head unit to an air outlet side of said base wherein said connecting unit includes at least two beams which are parallel to the surface of the head unit facing the disc surface;
an electro-mechanical transducer element forming at least a portion of each of said beams of said connecting unit and adapted for achieving fine movement of said head along the tracking direction relative to said disc-shaped recording medium;
a movable member carrying said head slider, and which is movable in a direction along the radius of said disc-shaped recording medium; and
control means for generating said driving signals supplied to said electromechanical transducer element provided in said head slider; and
wherein said control means supplies said driving signals to said electromechanical transducer elements to cause fine movement of said head relative to said disc-shaped recording medium for positioning said head at a target position and wherein each of said electro-mechanical transducer elements is being moved in response to supplied signals so that as one of the electromechanical transducer elements of one beam is in an extended state, another electro-mechanical transducer of another beam is in a contracted state for achieving fine movement of the head relative to the disc-shaped recording medium along the tracking direction.

19. The recording and/or reproducing apparatus according to claim 18 wherein said electro-mechanical transducer element is a piezo element, said control means supplying driving signals to said piezo element for causing stroke movement of said head with respect to the disc-shaped recording medium along the tracking direction.

20. The recording and/or reproducing apparatus according to claim 18 wherein
an optical recording and/or reproducing head and a magnetic recording and/or reproducing head are combined in a single head; and
a magnetic head and an optical head and selectively used for recording and/or reproducing information.

21. The recording and/or reproducing apparatus according to claim 18 wherein an optical reproducing head and a magnetic recording and/or reproducing head are combined in said head; and
the magnetic head and the optical head are selectively used for recording and/or reproducing information.

22. A head actuator carrying a head for recording information on and/or reproducing information from a disc-shaped recording medium, said head being movable in the radial direction of the disc-shaped recording medium for positioning at a target position, said head actuator comprising:
a head slider including a base having a recording medium surface facing said disc-shaped recording medium wherein said base is formed of $Al_2O_3$—TiC;
a head unit arranged on said head slider so that said head faces said disc-shaped recording medium;
a connecting unit for connecting said head unit to an air outlet side of said base;
an electro-mechanical transducer element forming at least a portion of said connecting unit, and
a movable member carrying said head slider which is movable in a tracking direction along the radius of said disc-shaped recording medium;
wherein said electro-mechanical transducer element is being moved in response to supplied driving signals for achieving fine movement of said head relative to the disc-shaped recording medium along the tracking direction.

23. A head actuator carrying a head for recording information on and/or reproducing information from a disc-shaped recording medium, said head being movable in the radial direction of the disc-shaped recording medium for positioning at a target position, said head actuator comprising:
a head slider including a base having a recording medium surface facing said disc-shaped recording medium;
a head unit arranged on said head slider so that said head faces said disc-shaped recording medium wherein said head unit is formed of $Al_2O_3$—TiC;
a connecting unit for connecting said head unit to an air outlet side of said base;
an electro-mechanical transducer element forming at least a portion of said connecting unit, and
a movable member carrying said head slider which is movable in a tracking direction along the radius of said disc-shaped recording medium;
wherein said electro-mechanical transducer element is being moved in response to supplied driving signals for achieving fine movement of said head relative to the disc-shaped recording medium along the tracking direction.

* * * * *